(No Model.) 2 Sheets—Sheet 2.
W. H. BURNET, J. SEARS & O. G. BURNHAM.
APPARATUS FOR DELINTING COTTON SEEDS OR THE HULLS.

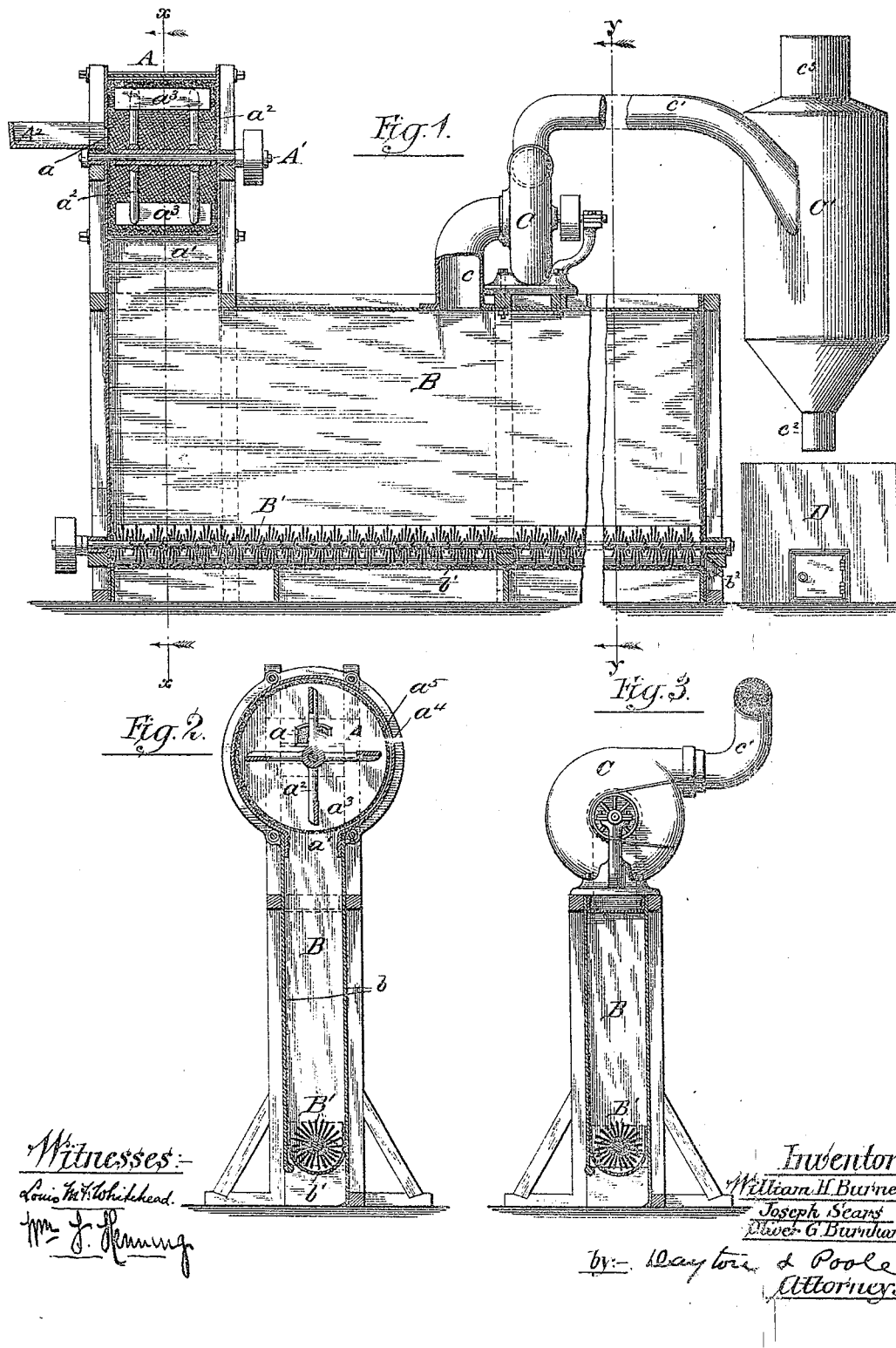

No. 440,259. Patented Nov. 11, 1890.

Witnesses:

Inventors:
William H. Burnet
Joseph Sears
Oliver G. Burnham
by Dayton & Poole
Attorneys

UNITED STATES PATENT OFFICE.

WILLIAM H. BURNET, JOSEPH SEARS, AND OLIVER G. BURNHAM, OF CHICAGO, ILLINOIS, ASSIGNORS, BY DIRECT AND MESNE ASSIGNMENTS, TO THE AMERICAN STOCK FOOD AND FIBRE COMPANY, OF SAME PLACE.

APPARATUS FOR DELINTING COTTON-SEEDS OR THE HULLS.

SPECIFICATION forming part of Letters Patent No. 440,259, dated November 11, 1890.

Application filed July 26, 1887. Serial No. 245,319. (No model.)

*To all whom it may concern:*

Be it known that we, WILLIAM H. BURNET, JOSEPH SEARS, and OLIVER G. BURNHAM, all of Chicago, in the county of Cook and State of Illinois, have invented certain new and useful Improvements in Apparatus for Delinting Cotton-Seeds or the Hulls; and we do hereby declare that the following is a full, clear, and exact description thereof, reference being had to the accompanying drawings, and to the letters of reference marked thereon, which form a part of this specification.

This invention relates to apparatus for removing and recovering the lint from cotton-seed or cotton-seed hulls and at the same time reducing the seeds or hulls to meal; and it consists in the matters hereinafter set forth, and pointed out in the appended claims.

Figure 4:
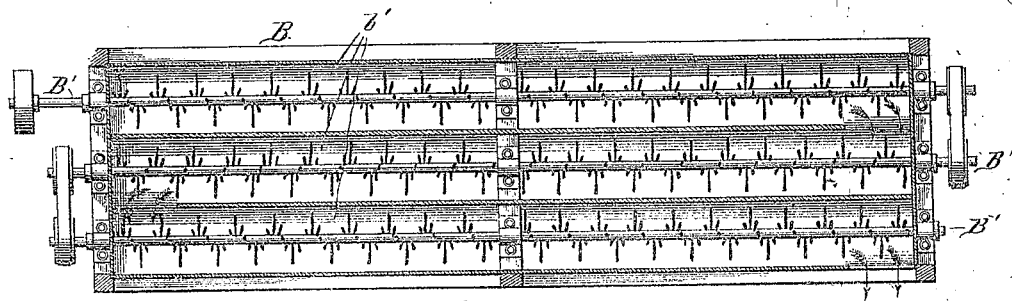
Figure 5:
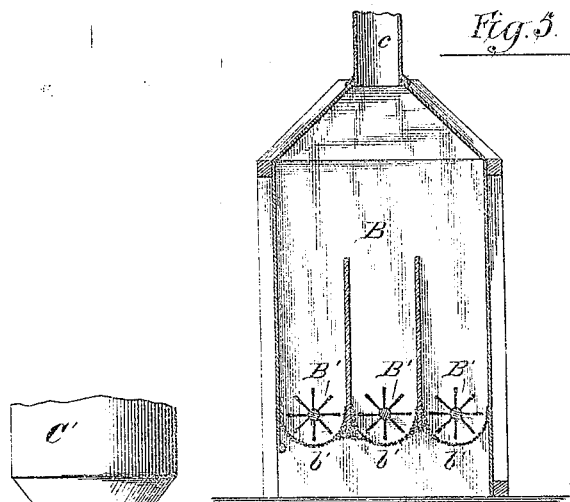
Figure 6:
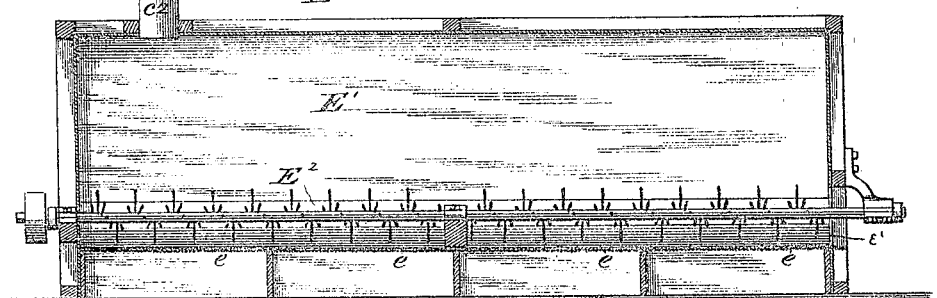

In the drawings, Figure 1 is a vertical longitudinal section through the disintegrator and separating-chamber, an exhaust-fan, lint-collector, and lint-receptacle being shown in elevation. Fig. 2 is a transverse vertical section of the apparatus in the line $x\ x$ of Fig. 1. Fig. 3 is a transverse vertical section in the line $y\ y$ of Fig. 1. Fig. 4 is a horizontal section of a separating-chamber having a plurality of compartments. Fig. 5 is a vertical section of the separator of Fig. 4. Fig. 6 is a vertical longitudinal section of a "duster," which, as an additional improvement, may be substituted for the lint-box or inserted between the collector and said box or receptacle, the lower part of a collector being shown in elevation.

A represents a disintegrator consisting of a stationary or non-rotating cylinder having a rough inner peripheral surface and a series of revolving blades or beaters. The cylinder is arranged with its axis horizontal and has an inlet-opening at $a$ through one of its heads and preferably near its axis, and is closed at its opposite end, the discharge-passage $a'$ being at the periphery. In the axis of the cylinder is mounted a rotating shaft $A'$, having radial arms $a^2$, to the outer ends of which are secured the blades or wings $a^3$, parallel with and, say, half an inch distant from the inner periphery of the cylinder. To give a desired roughness to the inner peripheral surface of the cylinder, and also to properly control the discharge from the cylinder, the latter is in the present instance constructed of an outer imperforate shell or casing $a^4$ and an inner shell or lining $a^5$ of wire-cloth, which extends over the passage $a'$. The inlet $a$ of the cylinder leads from a suitable table $A^2$, from which the seeds or hulls are fed into the disintegrator.

B is a chamber in communication with the discharge-passage of the disintegrator A. Its side walls $b$, and top are imperforate, (except that they may be provided with sight-holes or registers, if desired,) and the bottom $b'$ is formed of a semi-cylindric screen.

$B'$ is a rotating shaft having radial pins arranged spirally therein and mounted in position to closely proximate the screen $b'$. Said shaft is thus adapted to serve both as an agitator for beating up the material on the screen and as a worm for carrying the same along from that end of the chamber directly beneath the disintegrator toward the opposite end, and to thereby distribute the material over the entire screen.

C is a suction-fan having its inlet-duct $c$ in communication with the chamber B and its discharge-duct $c'$ directed to a suitable receptacle. The duct $c'$ is here shown as terminating in a separator or lint-collector $C'$, of well-known construction, from which the air escapes at the top $c^3$, while the lint is collected therein and thrown out at the bottom $c^2$ into the receptacle D.

The operation of the machine is as follows: Either entire cotton-seeds having the lint thereon as they come from the gin or cotton-seed hulls having the lint thereon, are fed into the disintegrator A through the opening $a$, through which air also enters. The shaft $A'$ is rotated at a high speed, and the wings $a^3$ thereon, acting as beaters as well as fans, hurl the seeds or hulls by centrifugal force violently against the rough wall of the cylinder, by which action the seeds or hulls are finally broken into small fragments or meal, and the lint is detached therefrom. The detached lint and the fragments of seeds or hulls pass through the meshes of the screen over the opening $a'$ into the chamber B. The suction-fan C is intended to produce an air current which shall draw off the lint from said chamber, while the solid fragments are allowed to pass through or over the screen $b'$. Some part of the lint, in the use of a machine arranged precisely as here shown, never descends to the bottom of the chamber; but a larger part does so descend with the seed fragments. The rotating worm and beater-shaft B' agitates the mass upon the screen $b'$, throwing the lint upward, and the air-current induced upwardly through said screen by the fan C carries the lint with it through said fan to the collector C', whence the lint is discharged through the bottom opening at $c^2$. Meantime the reduced seed or hull substance is carried by the worm B' along the screen $b'$, and is wholly or largely worked through the screen, though a part thereof may be passed over the tail of the screen through the tail-spout $b^2$, which may be provided with a valve, if desired.

By the apparatus above described the separation of the lint from the seed or hulls is performed in a continuous operation, and the lint is detached simultaneously with the reduction of the seeds or hulls to small fragments or meal. The lint so detached is in available form as fiber for paper-stock, while the body of the seed is in condition for the expression of oil therefrom; or, if hulls alone be treated, the latter are in desirable form for feed or a fertilizer.

Instead of delivering the lint directly into a lint-box—such as D' in Fig. 1—a "duster" is desirably, and as a further improvement, inserted between the eduction-pipe $c'$ or the collector C and the lint-box, since a quantity of light fragments of seeds or hulls will inevitably be carried out of the separating-chamber B along with the lint.

E, Fig. 6, illustrates an improved means for screening or removing the dust, and also, if desired, the short fibers, from the mass of lint recovered. It consists of an elongated chamber E', having a semi-cylindric screen-cloth bottom $e$, over which rotates a worm beater severally similar to the corresponding parts in the separator B. The lint from the separator or collector is delivered by the fan into the chamber E' at the head of the worm-beater shaft, which, while carrying it toward the opposite end of the chamber, constantly picks the mass apart and whips the lint upward in a manner clearly favorable to the detachment of loose specks therefrom. These loosened specks find their way through the screen, while the lint or the longer fibers thereof are blown forward toward the outlet-opening $e'$ or tail of the screen.

The screen-bottom $e$ may be divided into sections of unequal mesh, and the mesh may be chosen to favor the escape through it of the shorter fibers of the lint along with the specks, so as to give a select product over the tail of the screen.

The dusting device may be duplicated or multiplied, if desired, and the material delivered through one screen sent to another, and the screening thereby carried on until the short lint which passes through the first duster-screen shall be itself separated from the dust and reclaimed for use as fiber of inferior "staple."

Instead of employing a collector of the character shown at C', the fan eduction $c'$, for the purposes of the invention as embraced in the preceding parts of the apparatus, may deliver the lint and air directly into a room or other receptacle. Commonly such receptacle will be provided with walls or openings covered with muslin, which will allow the air to escape while retaining the lint.

The collector C', as here shown, is preferable to such a lint-room as last above described. It consists of a cylinder having a wide central opening at the top and a funnel-shaped bottom, as shown. The flue $c'$ from the fan enters the cylinder in a tangential and downward direction near the top, by which arrangement the lint is whirled spirally downward along the inner surface of the cylinder and out at the funnel-opening at the bottom, while the greater part of the air is deflected upwardly and rises in a central current through the flue $c^3$. An example of this form of collector is described in Patent No. 370,021, dated September 13, 1887.

In Figs. 4 and 5 is shown a separator B, constructed to give the advantage of greater length in shorter space. It is provided with a plurality of troughs or compartments at the bottom, each provided with a screen-bottom and a worm beater, the foot of one trough communicating with the head of the adjacent one, so that the material passes from one to the other, and finally out, as before. The troughs are open at the top and are embraced within a single housing, which communicates with the induction-flue $c$ of the suction-fan. The more extended subjection of the material to the action of the beaters in the separator gives a cleaner lint product and correspondingly lessens the need or the work of the duster E.

The method employed in the operation of the above-described machine is the subject of another application for patent, Serial No. 232,006, pending at the date of filing this description.

We claim as our invention—

1. The combination of a disintegrator, a chamber communicating with the discharge-passage of said disintegrator and provided with an outlet, an agitator in said chamber, and a means for producing an air-current through said chamber, substantially as described.

2. The combination of a disintegrator, a chamber communicating with the discharge-passage of said disintegrator and provided with a perforated bottom and with an outlet, an agitator working in the chamber adjacent to said perforated bottom, and means for producing an air-current upwardly through the perforated bottom and out of the chamber, substantially as described.

3. The combination of a disintegrator, a chamber communicating with the discharge-passage of the disintegrator and provided with an agitator and an outlet, a screening mechanism connected with said outlet, and means for producing an air-current upwardly through the bottom of the chamber for carrying the lint to the screening mechanism.

4. The combination of a disintegrator, a chamber communicating with the discharge-passage of the disintegrator and provided with a screen-bottom, an agitator in the chamber, working near said screen-bottom, a suction-fan having its induction-passage connected with said chamber, and a screening mechanism arranged to receive the material delivered by the suction-fan.

5. The combination, with a disintegrator, of a chamber B, connected at one end with the discharge of the disintegrator and having a screen-bottom, a beater-worm B', rotating in proximity to the screen-bottom, and a suction-fan having its induction-passage connected with the chamber B, substantially as described.

6. The combination, with a disintegrator, of a chamber B, provided with a screen-bottom, a beater-worm B', rotating in proximity to the screen-bottom, a suction-fan having its induction-passage connected with the chamber B, a dusting-chamber E, connected at one end with the eduction-passage of the suction-fan and provided with a screen-bottom, and a rotating beater-worm arranged in proximity to the screen-bottom of the duster, substantially as described.

7. The combination of the disintegrator, a separating-chamber B, a suction-fan C, connected with said chamber, a lint-collector C', connected with the eduction-flue of the fan, and a dusting-chamber arranged to receive the lint from the collector, substantially as described.

8. The combination, in a machine for reducing cotton-seeds or cotton-seed hulls to meal and at the same operation detaching the lint therefrom, of a circular chamber having its axis substantially horizontal, said chamber being provided with heads at its opposite ends, in one of which is an inlet or feed opening, and being peripherally inclosed by an internally rough perforated metal wall, the perforations of which are smaller than the seeds or fragments of hulls to be disintegrated, and an axial rotating winged shaft, of which the wings proximate the peripheral inclosure, power mechanism adapted to revolve the wings at such high speed as to throw the seeds or hulls violently against the perforated metal wall of the cylinder with the effect of detaching the lint, breaking the seed or hull fragments, and producing a fan action, whereby the lint and meal produced from the seeds or hulls are promptly expelled through the peripheral perforations, and mechanism for separating the lint from the meal, connected with the disintegrator to receive the product thereof.

9. The combination, with a disintegrator, comprising a cylinder having a rough interior surface and provided with an inlet and with a discharge through perforations, and also comprising a shaft carrying wings or blades adapted to be rapidly rotated within the cylinder, of a suction-fan connected with the discharge of the disintegrator-cylinder, substantially as described.

10. The combination, in an apparatus for treating cotton-seeds or cotton-seed hulls, of a disintegrator constituted of a cylinder having a rough interior surface, an inlet at the end and an opening in the periphery, guarded by a perforated plate or wire-cloth and provided with an axial rotating shaft supporting beaters near the inner periphery of the cylinder, by which disintegrator the seeds or hulls are broken, the lint is detached therefrom, and both broken seeds and hulls and the lint are expelled, and a separator connected with the discharge-opening of the disintegrator, by which the lint is separated from the broken seeds or hulls, substantially as described.

In testimony that I claim the foregoing as my invention I affix my signature in presence of witnesses.

WILLIAM H. BURNET.
JOSEPH SEARS.
OLIVER G. BURNHAM.

Witnesses:
 GUY F. GOSMAN,
 I. C. LEWIS,
 HENRY L. MURHOUSE.